United States Patent
Dorgan

(10) Patent No.: US 7,662,275 B2
(45) Date of Patent: Feb. 16, 2010

(54) METHODS OF MANAGING WATER IN OIL SHALE DEVELOPMENT

(75) Inventor: John R. Dorgan, Golden, CO (US)

(73) Assignee: Colorado School of Mines, Golden, CO (US)

( * ) Notice: Subject to any disclaimer, the term of this patent is extended or adjusted under 35 U.S.C. 154(b) by 289 days.

(21) Appl. No.: 11/751,436

(22) Filed: May 21, 2007

(65) Prior Publication Data

US 2007/0277973 A1  Dec. 6, 2007

Related U.S. Application Data

(60) Provisional application No. 60/747,763, filed on May 19, 2006.

(51) Int. Cl.
- C10G 33/00 (2006.01)
- C10G 33/04 (2006.01)
- C10G 1/04 (2006.01)
- C10G 1/00 (2006.01)
- E21B 43/00 (2006.01)
- C02F 3/00 (2006.01)

(52) U.S. Cl. .............. 208/187; 208/188; 208/390; 208/391; 208/401; 208/414; 208/415; 208/418; 208/39; 208/41; 208/44; 208/45; 166/259; 166/261; 166/265; 166/266; 166/267; 166/256; 210/624; 210/631

(58) Field of Classification Search .......... 208/187, 208/188, 390, 391, 401, 414, 415, 418, 39, 208/41, 44, 45; 166/265, 266, 267, 256, 166/259, 261; 507/139, 136; 210/624, 631
See application file for complete search history.

(56) References Cited

U.S. PATENT DOCUMENTS

| 4,109,718 | A |   | 8/1978  | Burton, III |
|-----------|---|---|---------|-------------|
| 4,117,886 | A | * | 10/1978 | Honaker ........................ 166/259 |
| 4,169,506 | A | * | 10/1979 | Berry ........................... 166/256 |
| 4,328,863 | A |   | 5/1982  | Berry |
| 4,353,418 | A | * | 10/1982 | Hoekstra et al. ............ 166/259 |
| 4,532,991 | A | * | 8/1985  | Hoekstra et al. ............ 166/261 |

(Continued)

OTHER PUBLICATIONS

Bartis et al. "Oil Shale Development in the United States", Rand Corporation, available at www.rand.org/pubs/monographs/2005/RAND_MG414.pdf, Copyright 2005, 15 pages.

*Primary Examiner*—Walter D Griffin
*Assistant Examiner*—Huy-Tram Nguyen
(74) *Attorney, Agent, or Firm*—Sheridan Ross P.C.

(57) ABSTRACT

The present disclosure relates to a system and method of providing water management and utilization during the process of dewatering and retorting of oil shale. More specifically, the process described relates to co-producing potable and non-potable water, for various uses, during the extraction of petroleum from shale oil deposits. Generally, the process allows the production of multiple streams of waters or varying salinity and pressures at least one of which is of high enough pressure for reinsertion into geological formations or reservoirs, and another which may supply a potable water source. In one embodiment, the high pressure required for reinserting the non-potable water into geological formation or reservoirs may be utilized for producing the potable water supply. In another embodiment, the non-potable water supply may also be used for entraining and sequestering undesired emissions, such as $CO_2$.

17 Claims, 1 Drawing Sheet

U.S. PATENT DOCUMENTS

| | | |
|---|---|---|
| 4,886,118 A | 12/1989 | Van Meurs et al. |
| 6,581,684 B2 | 6/2003 | Wellington et al. |
| 6,591,906 B2 | 7/2003 | Wellington et al. |
| 6,688,387 B1 | 2/2004 | Wellington et al. |
| 6,702,016 B2 | 3/2004 | de Rouffignac et al. |
| 6,712,136 B2 | 3/2004 | de Rouffignac et al. |
| 6,715,546 B2 | 4/2004 | Vinegar et al. |
| 6,715,547 B2 | 4/2004 | Vinegar et al. |
| 6,715,548 B2 | 4/2004 | Wellington et al. |
| 6,715,549 B2 | 4/2004 | Wellington et al. |
| 6,722,429 B2 | 4/2004 | de Rouffignac et al. |
| 6,722,431 B2 | 4/2004 | Karanikas et al. |
| 6,725,920 B2 | 4/2004 | Zhang et al. |
| 6,729,395 B2 | 5/2004 | Shahin, Jr. et al. |
| 6,729,397 B2 | 5/2004 | Zhang et al. |
| 6,729,401 B2 | 5/2004 | Vinegar et al. |
| 6,732,794 B2 | 5/2004 | Wellington et al. |
| 6,732,795 B2 | 5/2004 | de Rouffignac et al. |
| 6,732,796 B2 | 5/2004 | Vinegar et al. |
| 6,736,215 B2 | 5/2004 | Maher et al. |
| 6,739,394 B2 | 5/2004 | Vinegar et al. |
| 6,742,588 B2 | 6/2004 | Wellington et al. |
| 6,742,593 B2 | 6/2004 | Vinegar et al. |
| 6,745,831 B2 | 6/2004 | de Rouffignac et al. |
| 6,745,832 B2 | 6/2004 | Wellington et al. |
| 6,745,837 B2 | 6/2004 | Wellington et al. |
| 6,758,268 B2 | 7/2004 | Vinegar et al. |
| 6,763,886 B2 | 7/2004 | Schoeling et al. |
| 6,769,483 B2 | 8/2004 | de Rouffignac et al. |
| 6,769,485 B2 | 8/2004 | Vinegar et al. |
| 6,789,625 B2 | 9/2004 | de Rouffignac et al. |
| 6,805,195 B2 | 10/2004 | Vinegar et al. |
| 6,871,707 B2 | 3/2005 | Karanikas et al. |
| 6,877,554 B2 | 4/2005 | Stegemeier et al. |
| 6,889,769 B2 | 5/2005 | Wellington et al. |
| 6,896,053 B2 | 5/2005 | Berchenko et al. |
| 6,902,003 B2 | 6/2005 | Maher et al. |
| 6,902,004 B2 | 6/2005 | de Rouffignac et al. |
| 6,910,536 B2 | 6/2005 | Wellington et al. |
| 6,913,078 B2 | 7/2005 | Shahin, Jr. et al. |
| 6,918,444 B2 | 7/2005 | Passey et al. |
| 6,966,372 B2 | 11/2005 | Wellington et al. |
| 6,994,160 B2 | 2/2006 | Wellington et al. |
| 7,036,583 B2 | 5/2006 | de Rouffignac et al. |
| 7,073,578 B2 | 7/2006 | Vinegar et al. |
| 7,086,468 B2 | 8/2006 | de Rouffignac et al. |
| 7,121,342 B2 | 10/2006 | Vinegar et al. |
| 2002/0108906 A1* | 8/2002 | Husain et al. ............ 210/636 |
| 2004/0055866 A1* | 3/2004 | Levine ..................... 202/205 |
| 2006/0180503 A1* | 8/2006 | Rendall ................... 208/390 |
| 2006/0254765 A1* | 11/2006 | Pfeiffer et al. ............ 166/246 |

\* cited by examiner

METHODS OF MANAGING WATER IN OIL SHALE DEVELOPMENT

CROSS REFERENCE TO RELATED APPLICATIONS

The present application claims the benefit of U.S. Provisional Patent Application Ser. No. 60/747,763, filed May 19, 2006, which is fully incorporated by reference herein.

FIELD OF THE INVENTION

The present invention generally relates to methods for managing and utilizing water during the extraction of petroleum from shale oil deposits.

BACKGROUND OF THE INVENTION

Water and the West—the linkage of these two words evokes images of conflict. From range wars, to failed farms, to limitations on development, water management in the Western United States is historically the difference between lucrative success and destitute failures. Methods are heretofore known for producing fresh water by membrane technologies such as reverse osmosis and/or nanofiltration. Methods are also known for in situ retorting of oil shale. U.S. Pat. Nos. 4,328,863, 4,109,718 and 6,732,796 are incorporated by reference herein in their entireties. However, a significant cost associated with reverse osmosis and nanofiltration appears in the form of providing adequate pressurization of the water. In addition, there have been problems associated with harmful emissions created during the retorting process, and with separating those harmful emissions from more beneficial gases such as hydrocarbons. Therefore, problems exist with current systems and methods for managing gaseous emissions and produced water during oil shale development processes.

SUMMARY OF THE INVENTION

In the present disclosure, these newer membrane technologies like reverse osmosis and nanofiltration are combined in a process that enables co-production of water streams of variable quality ranging from fresh drinking water to brackish water along with petroleum from shale oil. The proposed production of significant quantities of upgraded quality water will provide significant economic, political, and environmental benefits thereby potentially deciding the very viability of oil shale commercialization. A key advantage of the present disclosure is that if the costs of pressurizing water for deep well injection are being incurred anyway, for example, as required for use as a sink for carbon dioxide ($CO_2$) or other wastes to be sequestered into deep geological reservoirs, then the added cost of producing fresh water is minimal. This is due to the fact that the dominant cost in producing fresh water by reverse osmosis or nanofiltration is the cost of pressurization.

It is thus one aspect of the present invention to provide a system and method for producing, during the process of dewatering and/or retorting oil shale deposits, multiple streams of water of varying salinity and pressures.

In one embodiment of the invention, at least one of the streams of water is of high enough pressure for reinsertion into geological formations or reservoirs.

It is another aspect to provide a method for producing a potable water supply during the process of dewatering oil shale deposits, by utilizing the high-pressure requirements for reinserting at least one of the streams of water into geological formations or reservoirs.

It is another aspect of the present invention to utilize water during the process of dewatering and/or retorting oil shale deposits for commercialization. More specifically, the process described relates to co-producing water during the extraction of petroleum from shale oil deposits, which may in turn be used as a drinkable water supply, as a process water supply, for entraining and sequestering harmful emissions such as $CO_2$, or to otherwise assist in the retorting process.

Thus, in one embodiment of the present invention, a method for managing water produced from retorting an oil shale deposit is provided herein, comprising:

substantially dewatering said oil shale deposit;

collecting water from said dewatering of said oil shale deposit;

collecting at least one gas from said oil shale deposit;

pressurizing at least a portion of said water collected;

separating said at least a portion of said water into at least a first volume and a second volume;

entraining at least a portion of said at least one gas with said at least a first volume of water and sequestering said at least a portion of said at least one gas; and, processing said at least a second volume of water to produce water with a predetermined salinity.

DETAILED DESCRIPTION

Figure 1:
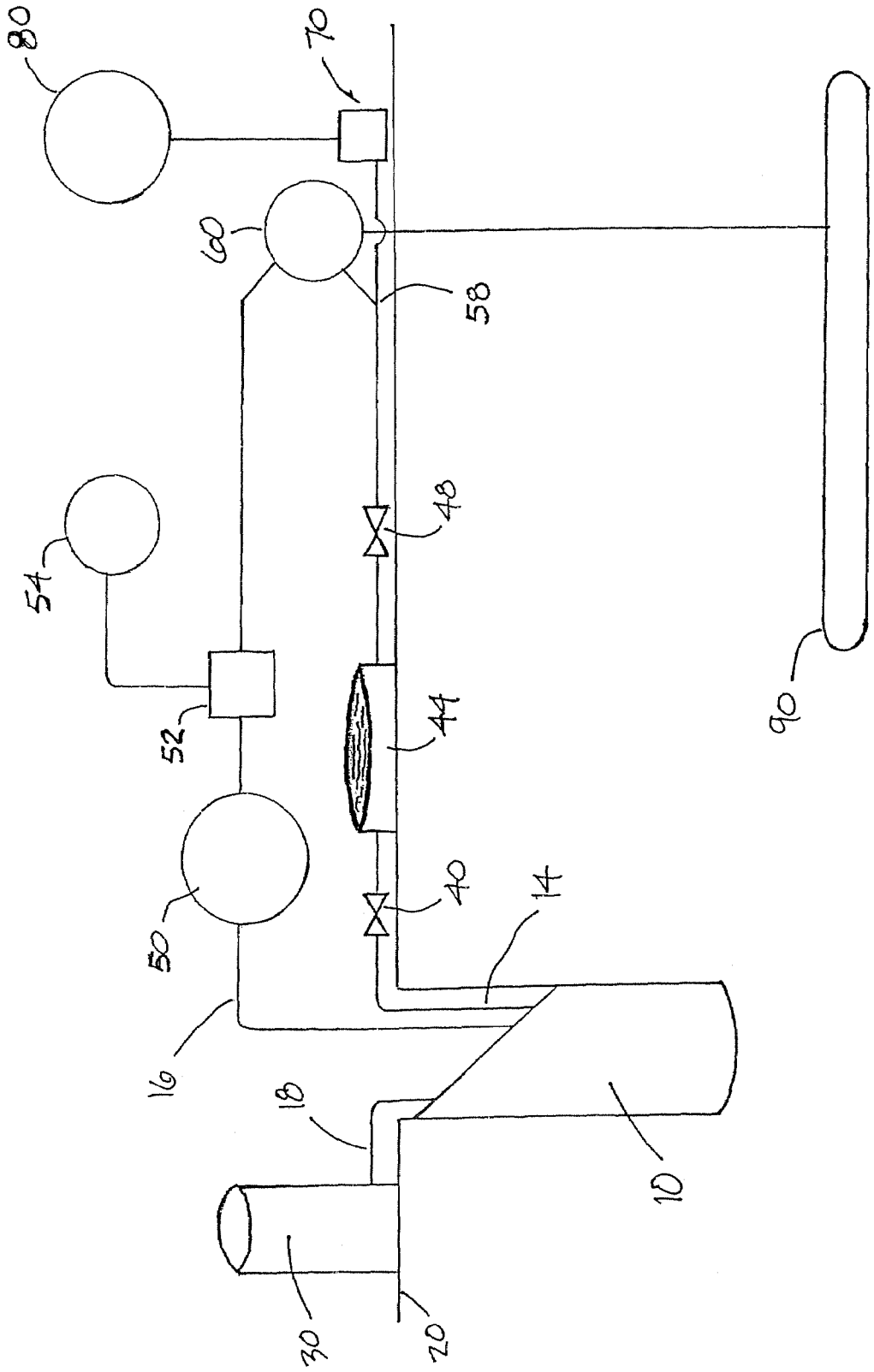
FIG. 1 is a schematic diagram according to one embodiment of the present disclosure.

The present disclosure relates to water management and utilization during the dewatering and retorting of oil shale. More specifically, the process described relates to co-producing potable and non-potable water, for various uses, during the extraction of petroleum from shale oil deposits. Generally, the process allows the production of multiple streams of waters or varying salinity and pressures at least one of which is of high enough pressure for reinsertion into geological formations or reservoirs, and another which may supply a potable water source.

Oil shale is generally referred to as sedimentary deposits existing below ground level, which contain organic materials and may be converted to shale oil. In particular, kerogen is a solid carbonaceous material from which shale oil can be produced. However, oil shale is typically stratified in horizontal layers well below the surface of the earth, and is often difficult and/or expensive to extract to the surface. Retorting is a known process whereby the shale is heated to a high temperature, which yields a fragmented permeable mass of either liquid or gaseous matter, or both. Retorting may be done either on the surface or beneath the earth, in situ. In either process, the retorting produces an emulsion of shale oil and water which must be separated or dewatered to extract the kerogen and/or other carbonaceous material.

In situ retorting of oil shale is one method which generally comprises the steps of (a) forming a retort below the ground level within the oil shale zone; (b) rubblizing at least a portion of the shale by explosives or other means; (c) heating the shale to a sufficient temperature to produce liquid and gaseous matter, including kerogen and hydrocarbons; (d) dewatering the shale and liquid matter produced; and (e) collecting the kerogen, hydrocarbons and other organic matter produced from the retort. These general steps are outlined in greater detail in U.S. Pat. No. 4,328,863, which is incorporated by reference herein in its entirety.

Another method for in situ retorting of oil shale is disclosed in U.S. Pat. No. 6,736,215 assigned to Shell Oil Company, which is incorporated by reference herein in its entirety. This method also provides for dewatering of shale and recirculation of the water collected. In addition, this patent also discloses a step for entraining emission gases, such as $CO_2$ with the spent carbon as a repository. Further embodiments discuss placement of the entrained gases beneath the ground surface.

As these prior art references make clear, dewatering of the shale layer is required prior to producing oil from shale through in situ retorting. As described in greater detail in U.S. Pat. No. 4,109,718, which is incorporated by reference herein in its entirety, the water present in the viscous emulsions created during the retorting process significantly affect the oils properties, resulting in difficulty in handling and transporting. It is possible to have to the order of 75% of the emulsion made up of water. Therefore, the step of dewatering is essential to in situ retorting of oil shale.

Referring now to FIG. 1, a system is shown for practicing the method in one embodiment of the present disclosure. An oil shale deposit 10 is located below ground level 20 from which various materials are extracted during the retorting process. Conduits 14, 16, 18 for pumping and/or collecting some of these elements are present in this embodiment. A first conduit 14 exists for collecting water either before or during the retorting process, or both. Liquids, such as ground water, may be pumped through the first conduit 14 by means of a pump 40 to be collected in a holding tank 44. In alternate embodiments, liquids may be brought to the surface by means other than a pump, and may or may not require the presence of a holding tank depending on the capabilities of the system to process liquids once they reach the surface.

A second conduit 16 exists for collecting and transporting gases resulting from the retorting process. These may include by way of example but not limitation such gases as hydrocarbons, hydrogen, hydrogen sulfide, carbon monoxide, and $CO_2$, as discussed in greater detail below. The gases collected in the system of the present embodiment are collected and stored in a holding vessel 50, but in other embodiments the holding vessel is not required. Gases may be collected by any known method, including but not limited to by collecting via a vacuum pump.

A third conduit 18 is used primarily for the collection of kerogen, which may be processed to produce petroleum. The kerogen may be stored above the surface in a storage tank 30 as shown in FIG. 1, but in various other embodiments may be collected and distributed immediately or may be stored at another location, including below ground level 20.

Liquid collected as a result of the retorting process is then pressurized to provide sufficient pressure to reinsert or sequester the liquid back into geological structures or reservoirs. In the present embodiment, this pressurization is created by a second pump 48 to provide the necessary pressure. The pressurized water may be separated at a certain point 58 for producing water of varying degrees of salinity using certain membrane technologies such as reverse osmosis or nanofiltration as explained in greater detail below. During production/retorting, a mixed gas stream is produced that is comprised of valuable hydrocarbons and other gases including carbon dioxide. Particularly for in situ retorting, the effort of maintaining and controlling the underground combustion process can be substantial, and collecting and properly handling the subsurface and surface pollution caused by the $CO_2$ is often a major endeavor. Referring again to FIG. 1, the system of the present embodiment includes at least one membrane module such as a gas separator 52 to split the valuable hydrocarbons from carbon dioxide ($CO_2$) and other undesirable gases. The gases collected in the storage vessel 50 are sent through the membrane gas separator 52, which removes undesired gases such as $CO_2$ from the more useful gases such as hydrocarbons, which are sent to a second vessel 54. The waste gases are entrained in the brackish liquid by a gas entrainer 60. The high-pressure water, now entrained with the waste gases, may be injected into a geological formation or reservoir, such as an underground aquifer 90 or other location as desired.

The liquid separated from this brackish water at some point 58 is also pressurized, and this pressure may be harnessed to accommodate certain membrane technologies such as reverse osmosis or nanofiltration. In the present embodiment, these processes may be skid mounted on the surface as shown in FIG. 1 as modules 70. In another embodiment, the membrane separation and other processes may be skid mounted in combination as a single set of modules as shown in FIG. 1 as modules 70. Thus, the separation point 58 is combined with the skid mounted reverse osmosis or nanofiltration unit—it produces two water streams—one is the brackish water that gets reinserted, the other is the "fresh" water supply (or simply the water with lower minerals content). The high-pressure water is purified and/or filtered by the process of reverse osmosis/nanofiltration modules 70, creating a potable water supply which may be stored in yet another holding tank 80 and used as desired. In another embodiment, the separation of minerals contained in the brackish water may also be beneficial, producing a source of lithium and/or boron, which may be further processed and used or sold.

Skid mounted membrane modules 70 may move with operations through dewatering and streams of different total dissolved solids (TDS) can be produced. Using newer membrane technologies, in particular nanofiltration, it is possible to use relatively lower pressures than previously required to achieve separation into a brackish brine stream and into a fresh water stream. Thus, non-potable water is pressurized and treated by a conventional reverse osmosis or nanofiltration processing to produce potable water, and the waste $CO_2$ gas stream is safely entrained in the high-pressure brackish water and may be injected deep underground to dispose of the $CO_2$ and other waste gases as well as the brackish water. Multiple membrane modules 70 may be employed to produce multiple streams of water of varying salinity and pressure.

A method according to the system of the present embodiment comprises: substantially dewatering an oil shale deposit; collecting water from said dewatering of said oil shale deposit; collecting at least one gas from said oil shale deposit; pressurizing at least a portion of said water collected; separating said at least a portion of said water into at least a first volume and a second volume; entraining at least a portion of said at least one gas with said at least a first volume of water and sequestering said at least a portion of said at least one gas; and, processing said at least a second volume of water to produce water with a predetermined salinity.

The use of brackish water of high mineral content as a repository for $CO_2$ and other waste gases as claimed includes a number of benefits. Dissolved carbon dioxide can react with various dissolved minerals, for example, the reaction with calcium can form the stable mineral calcium carbonate. This and other reactions mean the solubility of carbon dioxide is enhanced in the brackish water phase compared to pure water. In addition, the formation of stable mineral phases reduced the volume of the carbon to be sequestered by forming a slurry having high-density mineral solids contained within it.

In addition, pressurizing a liquid like water requires less energy than pressurizing a highly compressible gas like carbon dioxide so that entrainment of the compressible gas into the high pressure liquid via a venture tube or other means can reduce the energy content and cost of carbon dioxide compression. Alternatively, the waste gases may be separately compressed into the liquid or supercritical state prior to being mixed and entrained with the liquid water.

In alternate embodiments, certain streams of varying minerals content produced during production may be mixed or otherwise treated to improve the entrainment process described above. For example, the addition of agents including but not limited to water-soluble polymers, surfactants, acids and bases, and minerals such as calcium may be practiced. One method for providing the heating and retorting of the shale involves the placement of heating elements in vertical columns at spaced intervals along the surface above the shale deposits. (See www.rand.org/pubs/monographs/2005/RAND_MG414.pdf chapter 3, Oil Shale Technologies, and U.S. Pat. No. 6,732,796, which are incorporated by reference herein in their entireties). By way of example but not by limitation, for hexagonal patterns of placing heating elements at 40 ft spacing, water removal from a single cell corresponds roughly to a cylinder 1000 ft long with a circumference of 240 ft. At a porosity of 20% (which is only a rough approximation) this yield would be approximately 172,000 cubic feet of water, or four acre-ft, per each cell. At a per-capita water demand of 100 gal/person day there is on the order of 35 person years of water in each cell. Once this water is being handled, the above-described system and method for converting a great fraction of this water to potable water or for a variety of other uses. The fresh water production may partially or completely offset operating costs. One use of the water could be to serve the typically large population growth as the oil shale is being produced as well as meeting water demands of the oil shale operation itself. This approach solves the practical problem of supplying needed water to local residents while easing political considerations and environmental objections associated with water utilization.

In another embodiment, the cleanest water produced may be sold to municipalities, while the most brackish water can serve as a repository for produced $CO_2$ as a means of reducing $CO_2$ emissions. The proposed approach is particularly promising as it not only produces fresh water but also minimizes the volume of water that will need to be highly pressurized and reinserted with any accompanying $CO_2$. In addition, the highly concentrated brines can be a potential source to recover valuable elements including but not limited to lithium and boron.

Data on compositional analysis of water accompanying shale deposits is available through a variety of sources. Based on a matrix of water qualities representing different co-produced water chemistries (i.e., sodium bicarbonate, calcium bicarbonate, or sodium chloride types) as well as potential treatment goals (i.e., meeting potable and non-potable water quality standards), integrating different membrane systems and pretreatments (if needed) to the present system and method are contemplated. Screening of viable membrane products and selection of pre-treatment schemes can be evaluated based on laboratory data. Based on the separation characteristics of the membrane materials for the determined water quality, separation flow sheets may be similarly developed to provide the composition and costs of various streams estimated.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A method for managing water produced from retorting an oil shale deposit, comprising:
   substantially dewatering said oil shale deposit;
   collecting water from said dewatering of said oil shale deposit;
   collecting at least one gas from said oil shale deposit;
   applying fluid pressure to at least a portion of said water collected;
   separating said at least a portion of said water into at least a first volume and a second volume;
   entraining at least a portion of said at least one gas with said at least a first volume of water and sequestering said at least a portion of said at least one gas;
   processing said at a least a second volume of water to produce water with a predetermined salinity; and
   wherein said substantially dewatering said oil shale deposit occurs prior to said retorting of said oil shale deposit.

2. The method of claim 1 wherein said substantially dewatering said oil shale deposit occurs during said retorting of said oil shale deposit.

3. The method of claim 1 wherein said water at a predetermined salinity comprises potable water.

4. The method of claim 1 wherein said water at a predetermined salinity comprises agricultural use water.

5. The method of claim 1 wherein said water at a predetermined salinity comprises process water.

6. The method of claim 1 wherein said water at a predetermined salinity comprises a lower percentage of dissolved minerals and other compounds.

7. The method of claim 1 wherein said at least one gas comprises carbon dioxide.

8. The method of claim 1 wherein said at least one gas comprises hydrocarbons.

9. The method of claim 1 wherein said at least one gas comprises hydrogen.

10. The method of claim 1 wherein said at least one gas comprises hydrogen sulfide.

11. The method of claim 1 wherein said processing said at a least second volume of water comprises reverse osmosis.

12. The method of claim 1 wherein said processing said at a least second volume of water comprises nanofiltration.

13. A process for treating water collected from an in situ oil shale retort, comprising:
   substantially dewatering said in situ oil shale prior to retorting said in situ oil shale;
   pressurizing said water produced;

separating said pressurized water into at least a first volume and a second volume;

mixing at least one undesired gas with said at least a first volume of water for reinsertion into a geological formation; and processing said at least a second volume of water to produce potable water.

14. The process of claim 13 wherein said mixing comprises entraining said undesired gases with said at least a first volume of water.

15. The process of claim 13 wherein said processing said at least a second volume of water to produce potable water comprises reverse osmosis.

16. The process of claim 13 wherein said processing said at least a second volume of water to produce potable water comprises nanofiltration.

17. The process of claim 13 wherein said pressurizing said water produced comprises creating sufficient fluid pressure to reinsert said water produced into a geological formation.

* * * * *